US012682380B2

(12) United States Patent
Raipati et al.

(10) Patent No.: US 12,682,380 B2
(45) Date of Patent: Jul. 14, 2026

(54) METHOD, MEDIUM, AND SYSTEM FOR DYNAMIC USER INTERFACE CONTROL FOR EFFICIENT AND CONTROLLED ORDERING

(71) Applicant: BBY SOLUTIONS, INC., Richfield, MN (US)

(72) Inventors: Rambabu Raipati, Lakeville, MN (US); Stacey Langer, Minneapolis, MN (US)

(73) Assignee: BBY SOLUTIONS, INC., Richfield, MN (US)

( * ) Notice: Subject to any disclaimer, the term of this patent is extended or adjusted under 35 U.S.C. 154(b) by 0 days.

(21) Appl. No.: 18/435,832

(22) Filed: Feb. 7, 2024

(65) Prior Publication Data

US 2024/0177207 A1 May 30, 2024

Related U.S. Application Data

(63) Continuation of application No. 17/407,757, filed on Aug. 20, 2021, now Pat. No. 11,928,714.

(51) Int. Cl.
*G06Q 30/0601* (2023.01)
*G06F 3/04847* (2022.01)

(52) U.S. Cl.
CPC ..... *G06Q 30/0607* (2013.01); *G06F 3/04847* (2013.01); *G06Q 30/0641* (2013.01); *G06Q 30/0633* (2013.01)

(58) Field of Classification Search
CPC ........... G06Q 30/0607; G06Q 30/0641; G06Q 30/0601–0645; G06Q 20/401;
(Continued)

(56) References Cited

U.S. PATENT DOCUMENTS 8,463,627 B1    6/2013  Hirose et al.
9,361,446 B1 *  6/2016  Demirjian ........... H04L 63/1441
(Continued)

OTHER PUBLICATIONS

Tam Hanna, Stop the bots with Google reCAPTCHA, Creative Bloq, Jul. 17, 2019 (Year: 2019).*
(Continued)

*Primary Examiner* — Marissa Thein
*Assistant Examiner* — Anna Mae Mitros
(74) *Attorney, Agent, or Firm* — Schwegman, Lundberg & Woessner, P.A.

(57) ABSTRACT

Features for adaptation and control of a graphical user interface (GUI) and GUI functionality are disclosed herein. In an example, a user interface control is provided in a GUI to receive interaction from a user, which is provided in an enabled state to offer functionality for the user to attempt an initial commerce action with a constrained item. The user interface control is changed from the enabled state to a disabled state, in response to receipt of the interaction from the user, and a delay time period is calculated for the disabled state (with the delay time period being uniquely calculated for the user). The user interface control is changed from the disabled state to the enabled state, upon expiration of the delay time period, and the enabled state of the user interface control provides functionality for the user to perform a commerce action with the constrained item.

21 Claims, 11 Drawing Sheets

(58) Field of Classification Search

CPC ......... G06Q 30/0643; G06Q 30/06431; G06Q 30/06432; G06Q 30/06433; G06Q 30/06434; G06Q 30/06435; G06Q 30/0644; G06Q 30/06442; G06Q 30/06444; G06Q 30/0635; G06Q 30/06331; G06Q 30/06332; G06Q 30/06333; G06Q 30/06334; G06Q 30/0637; G06Q 10/083; G06Q 10/087; G06F 3/04847

USPC ..................................... 705/26.25, 26.1–27.2

See application file for complete search history.

(56) References Cited

U.S. PATENT DOCUMENTS

| | | | | |
|---|---|---|---|---|
| 9,457,264 | B1 * | 10/2016 | Chyou | .................... A63F 13/44 |
| 2002/0154114 | A1 * | 10/2002 | Christensen | ......... G06Q 10/087 |
| | | | | 705/28 |
| 2014/0173581 | A1 | 6/2014 | Grinberg et al. | |
| 2015/0205894 | A1 * | 7/2015 | Faris | .................. G06Q 30/0641 |
| | | | | 703/21 |
| 2018/0025411 | A1 | 1/2018 | Crogan et al. | |
| 2019/0180347 | A1 * | 6/2019 | Hughes | .............. G06Q 30/0264 |
| 2020/0177592 | A1 | 6/2020 | Idika et al. | |
| 2021/0272172 | A1 * | 9/2021 | Manders | ............ G06Q 30/0641 |
| 2021/0350446 | A1 | 11/2021 | D'haenens et al. | |

OTHER PUBLICATIONS

"U.S. Appl. No. 17/407,757, Advisory Action mailed May 31, 2023", 3 pgs.

"U.S. Appl. No. 17/407,757, Advisory Action mailed Sep. 13, 2022", 5 pgs.

"U.S. Appl. No. 17/407,757, Appeal Brief filed Jul. 10, 2023", 30 pgs.

"U.S. Appl. No. 17/407,757, Corrected Notice of Allowability mailed Nov. 27, 2023".

"U.S. Appl. No. 17/407,757, Examiner Interview Summary mailed Apr. 19, 2022".

"U.S. Appl. No. 17/407,757, Final Office Action mailed Apr. 21, 2023", 24 pgs.

"U.S. Appl. No. 17/407,757, Final Office Action mailed May 25, 2022", 21 pgs.

"U.S. Appl. No. 17/407,757, Non Final Office Action mailed Jan. 20, 2022", 18 pgs.

"U.S. Appl. No. 17/407,757, Non Final Office Action mailed Dec. 14, 2022", 24 pgs.

"U.S. Appl. No. 17/407,757, Notice of Allowance mailed Nov. 1, 2023", 20 pgs.

"U.S. Appl. No. 17/407,757, Response filed Mar. 13, 2023 to Non Final Office Action mailed Dec. 14, 2022", 14 pgs.

"U.S. Appl. No. 17/407,757, Response filed Apr. 19, 2022 to Non Final Office Action mailed Jan. 20, 2022", 16 pgs.

"U.S. Appl. No. 17/407,757, Response filed May 17, 2023 to Final Office Action mailed Apr. 21, 2023", 10 pgs.

"U.S. Appl. No. 17/407,757, Response filed Aug. 25, 2022 to Final Office Action mailed May 25, 2022", 16 pgs.

"Checkout Delay", (c) 2019 CodeSlayer Ltd. [online]. Retrieved from the Internet: <URL: http://docs.teamslayer.com/supremeslayer/features/checkout-delay/>, (2019), 2 pgs.

"How does Wait.li work?", (c) Bolle Apps 2021. [online]. Retrieved from the Internet: <URL: https://docs.wait.li/article/12-how-does-wait-li-work>, (last updated Jul. 8, 2020), 2 pgs.

"Okay, how does bestbuy website work when adding to cart?", [online]. Retrieved from the Internet: <URL: https://www.reddit.com/r/nvidia/comments/jrmust/okay_how_does_bestbuy_website_work_when_adding_to/?sort=confidence, (Feb. 16, 2021), 28 pgs.

"Protect your store from bots", Shopify held center [online]. [retrieved Feb. 19, 2021]. Retrieved from the Internet: <URL: https://help.shopify.com/en/manual/checkout-settings/bot-protection>, (Feb. 10, 2021), 5 pgs.

"Why Does Nike Make Me "Wait in Line" for Some Products?", (c) 2021 Nike, Inc. [online]. Retrieved from the Internet: <URL: https://www.nike.com/help/a/waiting-line>, (2021), 3 pgs.

Sisario, Ben, "Concert Industry Struggles with 'Bots' that Siphon Off Tickets", New York Times, (May 26, 2013), 3 pgs.

* cited by examiner

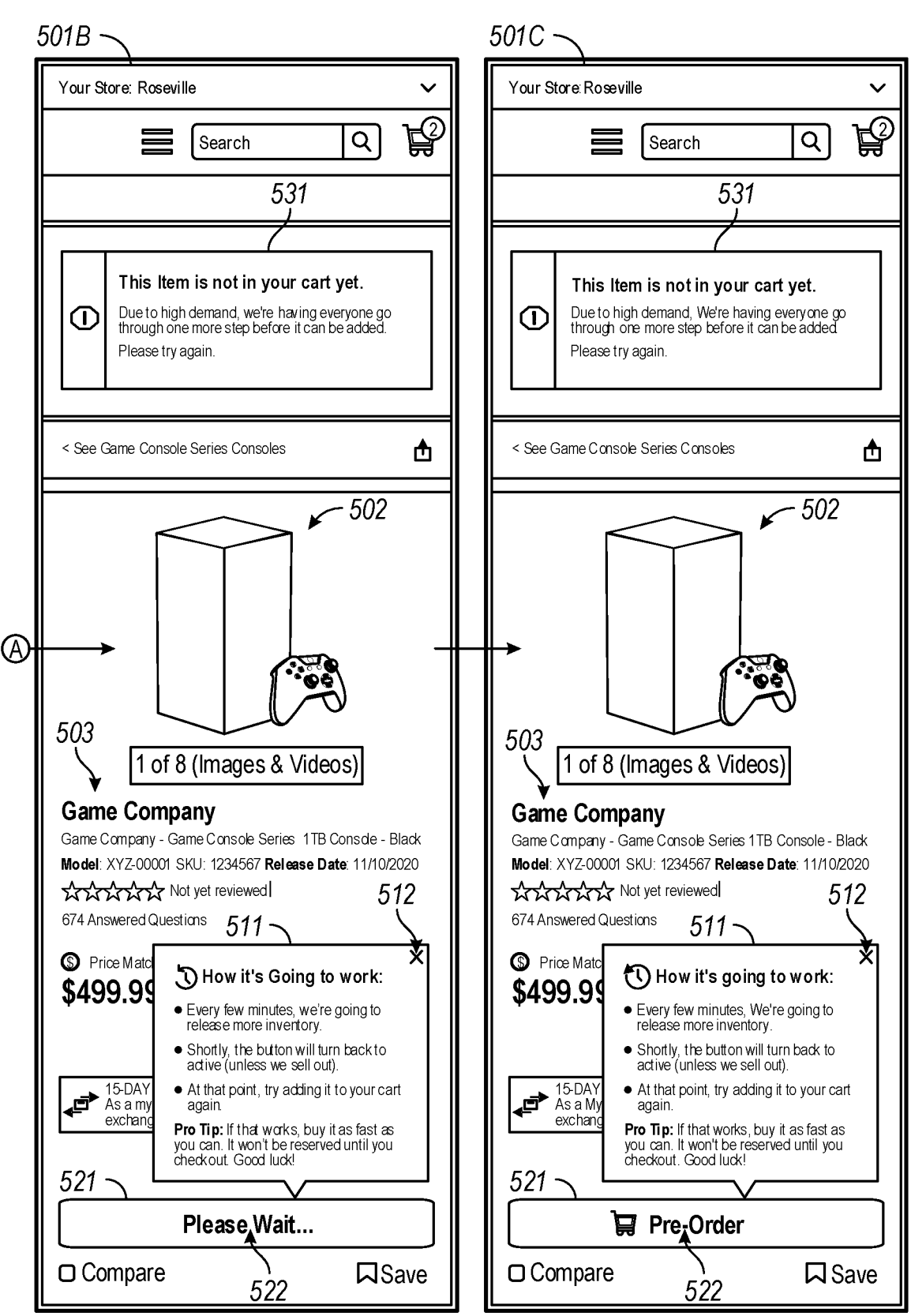
FIG. 5B          FIG. 5C

601A

603

Important Update: See the latest on our stores, services and safety plans.  >

Your Store: Roseville  ⌄

☰  | Game Console X  ✕ | Q |  🛒②

Safe, curbside pickup.
We're here to get you what you need  Learn more

62 Results for "Game Console X" in Game Console
Search all categories instead.

⇄ Filter & Sort | Get it fast ⌄ | Features ⌄ | Brand ⌄

Game Console All Access Available

New! Game Company - Game Console Series 1TB Console - Black

Model: XYZ-00001Z  Release Date: 11/10/2020

Ⓢ Price Match Guarantee
$499.99
☆☆☆☆☆
Not yet reviewed
Pre-order now to reserve yours
Check all availability ⌄

🛒 Pre-Order

612

☐ Compare    🔖 Save

611

Game Console All Access Available

New! Game Company - Game Console Series 512 GB All-Digital Console (Disc-free Gaming) - White Model: XYZ-00001Y  Release Date: 11/10/2020

Ⓢ Price Match Guarantee
$299.99
☆☆☆☆☆
Not yet reviewed
Pre-order now to reserve yours
Check all availability ⌄

🛒 Pre-Order

613

☐ Compare    🔖 Save

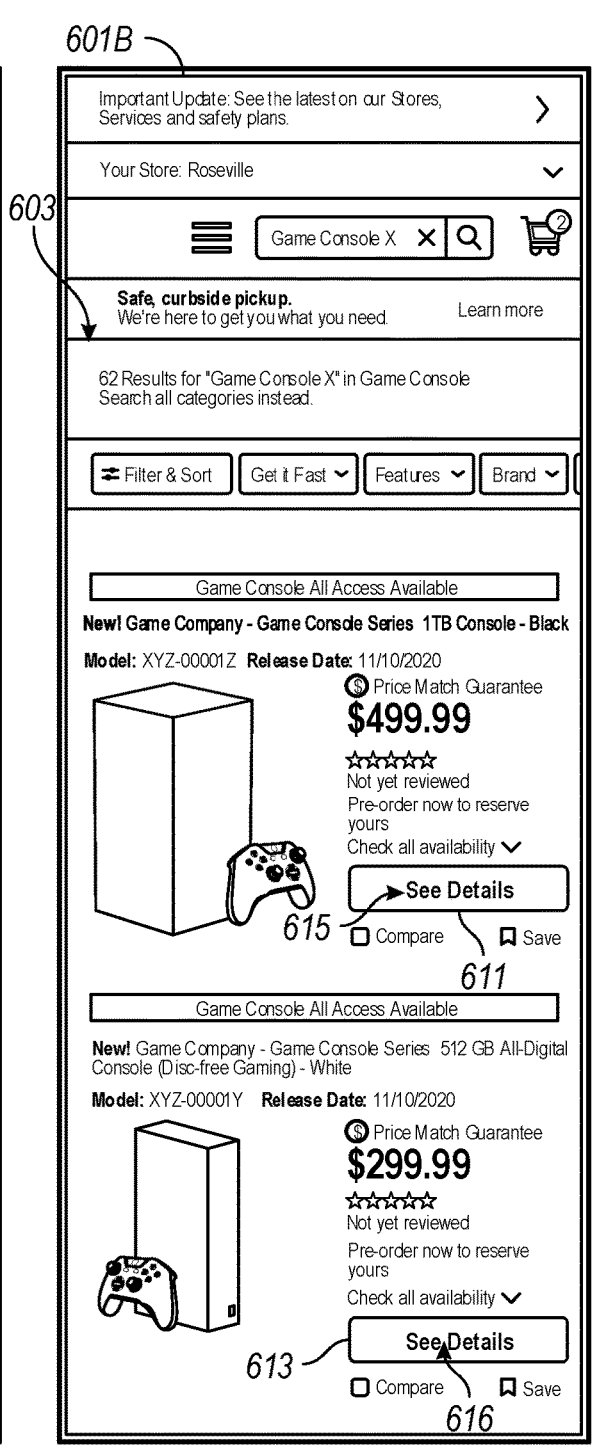

601B

603

Important Update: See the latest on our Stores, Services and safety plans.  >

Your Store: Roseville  ⌄

☰  | Game Console X  ✕ | Q |  🛒②

Safe, curbside pickup.
We're here to get you what you need.  Learn more

62 Results for "Game Console X" in Game Console
Search all categories instead.

⇄ Filter & Sort | Get it Fast ⌄ | Features ⌄ | Brand ⌄

Game Console All Access Available

New! Game Company - Game Console Series 1TB Console - Black

Model: XYZ-00001Z  Release Date: 11/10/2020

Ⓢ Price Match Guarantee
$499.99
☆☆☆☆☆
Not yet reviewed
Pre-order now to reserve yours
Check all availability ⌄

See Details

615

☐ Compare    🔖 Save

611

Game Console All Access Available

New! Game Company - Game Console Series 512 GB All-Digital Console (Disc-free Gaming) - White Model: XYZ-00001Y  Release Date: 11/10/2020

Ⓢ Price Match Guarantee
$299.99
☆☆☆☆☆
Not yet reviewed
Pre-order now to reserve yours
Check all availability ⌄

See Details

613

☐ Compare    🔖 Save

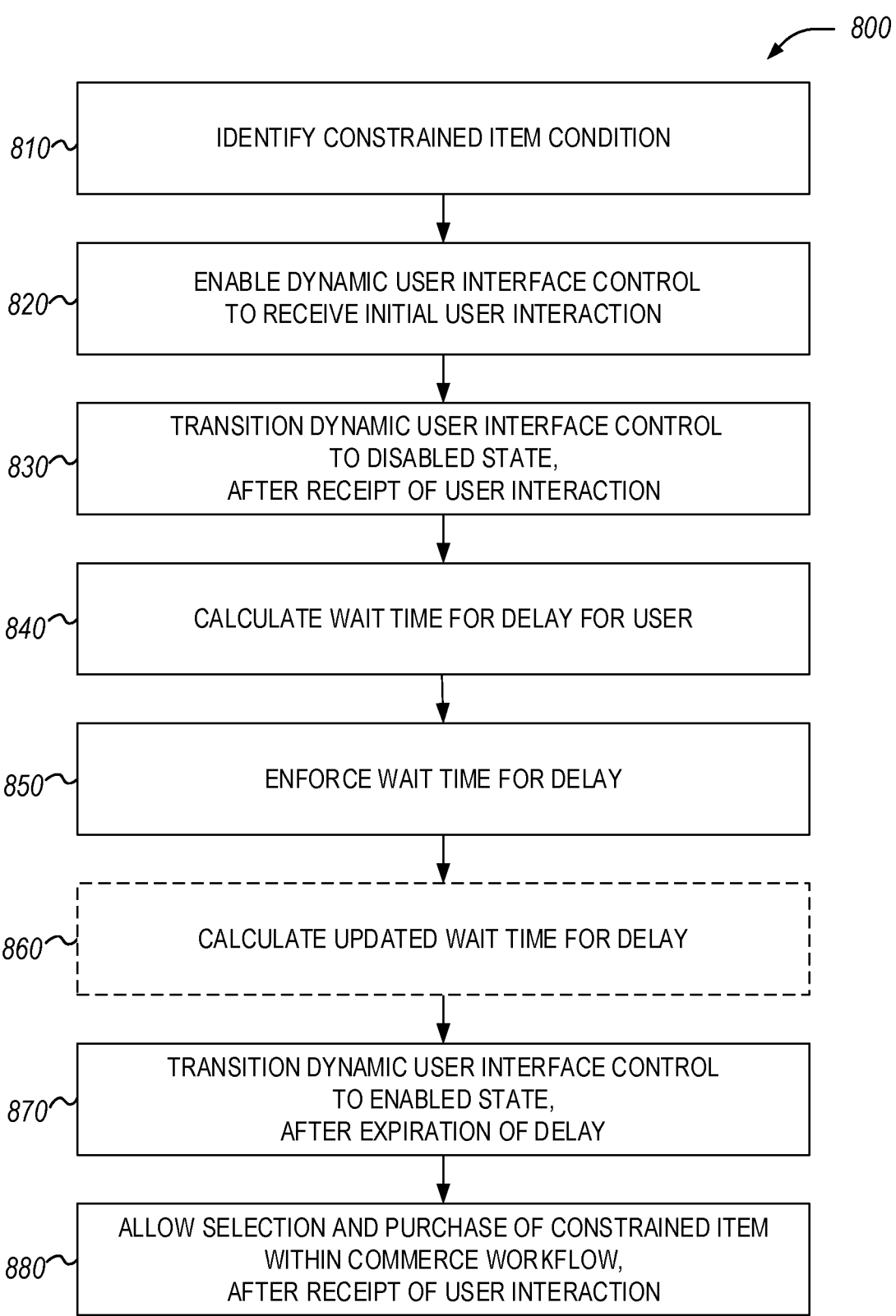

*800*

810 — IDENTIFY CONSTRAINED ITEM CONDITION

820 — ENABLE DYNAMIC USER INTERFACE CONTROL
TO RECEIVE INITIAL USER INTERACTION

830 — TRANSITION DYNAMIC USER INTERFACE CONTROL
TO DISABLED STATE,
AFTER RECEIPT OF USER INTERACTION

840 — CALCULATE WAIT TIME FOR DELAY FOR USER

850 — ENFORCE WAIT TIME FOR DELAY

860 — CALCULATE UPDATED WAIT TIME FOR DELAY

870 — TRANSITION DYNAMIC USER INTERFACE CONTROL
TO ENABLED STATE,
AFTER EXPIRATION OF DELAY

880 — ALLOW SELECTION AND PURCHASE OF CONSTRAINED ITEM
WITHIN COMMERCE WORKFLOW,
AFTER RECEIPT OF USER INTERACTION

*FIG. 8*

METHOD, MEDIUM, AND SYSTEM FOR DYNAMIC USER INTERFACE CONTROL FOR EFFICIENT AND CONTROLLED ORDERING

RELATED APPLICATIONS

This application is a continuation of U.S. patent application Ser. No. 17/407,757, filed Aug. 20, 2021, which is incorporated herein by reference in its entirety.

TECHNICAL FIELD

Embodiments discussed herein generally relate to defined functionality and graphical user interface features used in electronic computing and communication systems. Certain embodiments discussed herein relate to techniques which provide pre-order and queueing functionality in website and apps, for the management of orders and related computer-initiated transactions.

BACKGROUND

It is a well-known and common challenge for companies providing e-commerce websites and commerce services to handle high velocity events from a large number of requesters. Such high velocity events may involve handling hundreds or thousands of requests to purchase or reserve some item, resulting in a sudden and significant surge of traffic often in a short time frame (seconds to minutes). High velocity events may start at a particular time and continue for a sustained period of time due to reasons such as a new product release becoming available for reservation or pre-order, or a deal or promotion on a product or service being released for purchase. Example high velocity events may include the release of new product lines for gaming consoles, graphic cards, or smartphones, or "door buster" sales that are offered by retailers during holidays. Another similar example of a high velocity event involves the sale of tickets to some event with limited seating or attendance. In each of these situations, the demand for the constrained item far exceeds the supply available.

Constrained items generate huge demand from end customers in addition to third parties such as resellers who attempt to buy the item when it is in short supply. Some reseller users will use various techniques to purchase as many items as possible, as quickly as possible, and use bots that run automated scripts to continuously probe the website for availability of these products. Such bots are often designed to immediately start placing orders at a high velocity, to start orders before even real-world customers are aware of the product availability.

Thus, from a technical perspective, the sale of highly constrained items will generate a rush of network traffic, requests, and ultimately orders and transactions, unless some control mechanism is introduced. The sale of such items also introduces many scale challenges to ensure network availability and fairness to real-word participants. While various forms of waiting rooms, queues, captchas, and reservation systems have been introduced in an effort to defeat bots and maintain availability for real-world consumers, these techniques have not been fully scalable or successful.

BRIEF DESCRIPTION OF THE DRAWINGS

FIGS. 5A to 5C illustrate example implementations of a sequence of features for a dynamic user interface control, located within a software app, according to an example.

FIGS. 6A to 6B depict additional example implementations of the dynamic user interface control within a software app, according to an example.

FIG. 8 illustrates a flowchart of an example method for adaptation of a user interface control in a software graphical user interface, for use with constrained item scenarios, according to an example.

DETAILED DESCRIPTION

Figure 1:
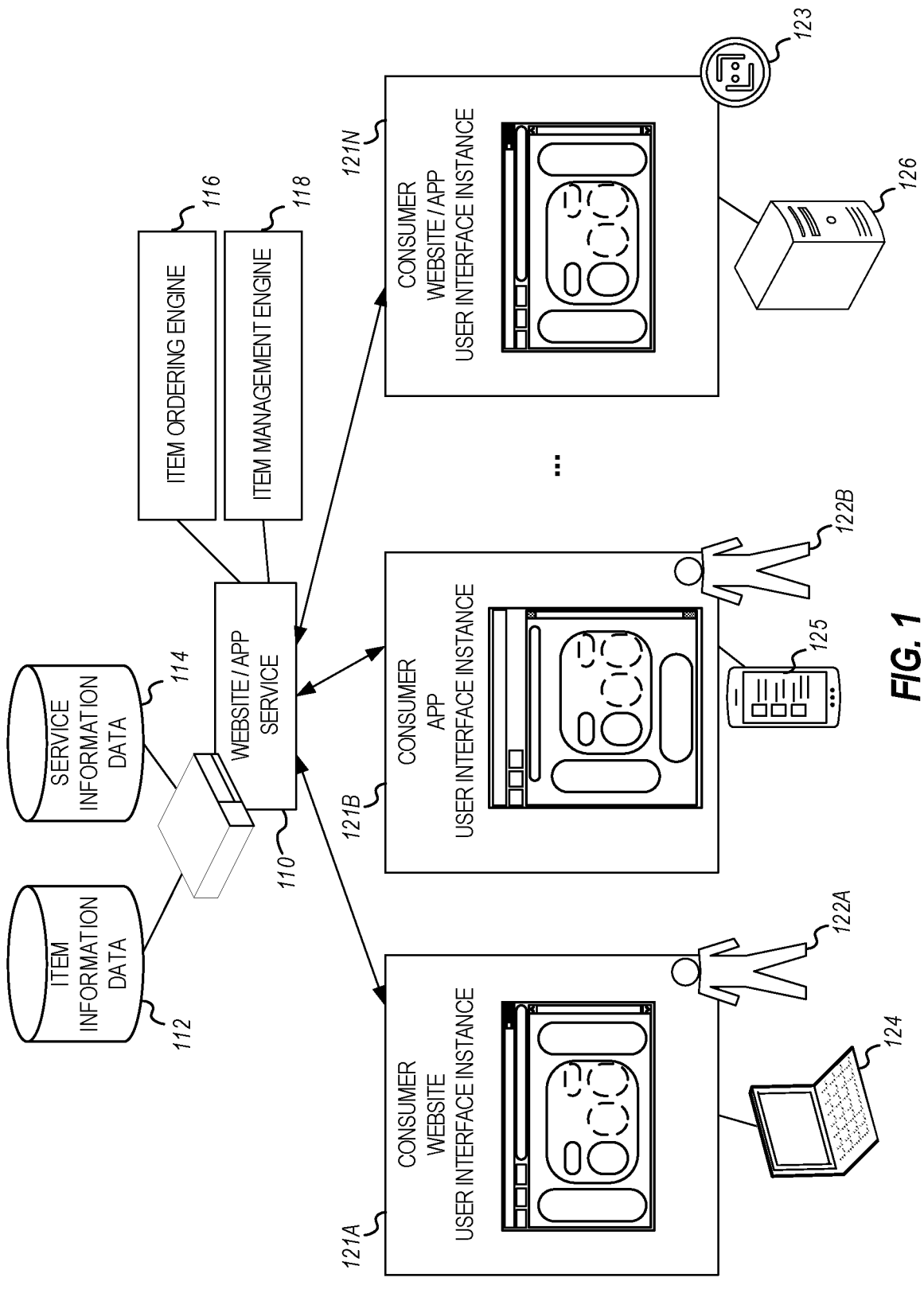
FIG. 1 illustrates an overview of a scenario for ordering of a highly constrained item according to an example.

The following description and drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

The examples discussed herein are directed to techniques for graphical user interfaces of one or more computing systems. Such techniques include the introduction and control of delays for constrained (i.e., in-demand) items, and dynamic functionality to enable, disable, or defer functionality for the selection, reservation, pre-order, purchase, or similar actions with the constrained items. The techniques discussed herein also include the use of tracking identifiers and adaptive detection of interactions, so that the delays for the constrained items cannot be bypassed and so that intended limits or restrictions on item availability cannot be avoided. The techniques discussed herein also introduce measures to prevent circumvention by bots and automated agents.

In a first aspect, a dynamic user interface control (e.g., button) is provided with functionality to introduce a delay or waiting workflow, before ordering actions can be taken with constrained items. For instance, a button designated for adding a product to a shopping cart may introduce a multi-minute delay unique to the user that disables the button, and the button may then become dynamically enabled after the delay has elapsed. Such delays may also introduce the effect of spacing out requests, so that a server is not overloaded with instantaneous requests from hundreds or thousands of users, and ultimately to provide humans with a fairer opportunity to respond and perform the purchase transaction.

This dynamic user interface control can be placed in a variety of locations within the user interface and be invoked by existing types of user interface controls such as buttons, links, or menu options. For example, in an e-commerce setting, the dynamic user interface control may be a button that is located on an individual product page or screen, on a page or screen with a list of multiple products, on a search results page or screen with a single or multiple search results, and the like. Interaction with the dynamic user interface control may initiate a workflow for reserving, purchasing, or taking another similar action with a product, service, or related item(s).

In a further aspect, the dynamic user interface control may implement mechanisms that are intended to respond to behaviors by human users, and which introduce additional delay (or disabling functionality) in an effort to detect or respond to behaviors by non-human users (i.e., automated bots) or human users that are abnormal or abusive. This may include monitoring for unintended or rapid clicks or interaction with a dynamic user interface control button, and identifying if more than a certain number of clicks are provided on the button when the button is in its disabled state. A variety of potentially abusive or unfair behaviors then may be detected to prevent such entities from engaging in a purchase transaction.

As discussed herein, various formats and implementations may be provided for the dynamic user interface control, although many of the following examples are provided with reference to an example graphical user interface button. Many of the techniques discussed herein are also presented in the context of a website graphical user interface and functionality provided within a webpage and browser. It will be understood, however, that other forms of graphical user interfaces such as mobile device (e.g., tablet, smartphone) software apps and other forms of user interface navigational or selection components may be used.

FIG. 1 illustrates an overview of a scenario for ordering of a highly constrained item, based on requests from consumers and users according to an example described herein. A consumer, as used herein, is not necessarily limited to a personal home user or private customer, but may include a variety of entities representing a person, business entity, organization, etc. A user, as used herein, refers to a broader set of entities including both consumers and automated agents (including bots) who interact with the user interface. In the scenario of FIG. 1, traffic may originate from both consumers and automated agents, such as from consumers 122A, 122B, and software bot 123.

As shown, the consumers 122A, 122B respectively access a service 110 via a website or app, through user interface instances 121 including a consumer website user interface instance 121A operating on a computing device 124 (e.g., personal computer (PC)) of the consumer 122A, and through a consumer app user interface instance 121B operating on a computing device 125 (e.g., smartphone, tablet) of the consumer 122B. In an example, the user interface instance 121A is provided from a website operated in a web browser of the computing device 124, whereas the user interface instance 121B is provided from a software app operated on the computing device 125. In the scenario of FIG. 1, the consumers 122A, 122B operate the user interface instances 121A, 121B to identify, browse, reserve, purchase, schedule, or otherwise interact with aspects of a particular product or service. Example arrangements of portions of consumer user interfaces in an e-commerce setting is provided in FIGS. 3 to 6B and discussed below.

The user interfaces 121 may be hosted or exposed by an internet-accessible service 110 by or on behalf of a business entity such as a retailer. For instance, the service 110 may operate or integrate with logic within an item ordering engine 116 which provides workflows for ordering features such as shopping carts, lists, checkout, payment, and the like. The service 110 may also operate or integrate with logic within an item management engine 118 which manages the type of functionality and availability for a constrained item as well as other available (or unavailable) items.

The user interfaces 121 may be assembled by the service 110 to provide a variety of pre-programmed or newly-assembled content such as item information data 112 or service information data 114 obtained from one or more data stores, servers, content delivery network (CDN) caches, and the like. The user interfaces 121 may present various forms of data, in the form of text, graphics, and video, relating to the items including the constrained item, and related products, services, or other informational content. It will be understood that especially in a constrained item setting, such as from a sale or new product release, thousands of sessions may occur from among many different consumers, thus leading to high demand and data traffic.

In contrast to the use of the website or app by the human users 122A, 122B, a software bot 123 may also access an instance of the user interface 121N. A variety of automated or semi-autonomous agents (generally referred to as a "bot" or "bots") have been developed in an effort to place orders for highly constrained items. Typically, a bot runs automated scripts to continuously probe a website or app for availability of some products or items, and when the products or items become available, the bots immediately start placing orders at a high rate.

In addition to issues with bots, the availability of highly constrained items is often accompanied with high resource demand of the website, app, or service 110, which may cause failure or delays especially if thousands of users are attempting to conduct purchase transactions with the highly constrained items at the same time. With conventional approaches, a website is not able to distinguish between legitimate customer traffic and reseller bot traffic, thus compounding the scale challenges.

Some limited workarounds have been developed in attempt to prevent scaling issues. For example, CDNs may employ throttling to traffic at the edge to manage high traffic volumes. However, the use of scaling infrastructure results in extremely high operational cost, and most often this is not enough to prevent an outage as websites cannot handle the traffic if the traffic volumes exceed the infrastructure to support it. Likewise, many companies do not have the ability to dynamically scale traffic depending on where the applications are deployed (cloud or private data centers with fixed capacity) and how their applications are designed or architected. More critically, however, is that retailers and manufacturers may not want bots to obtain all inventory of some product or obtain an unfair advantage in purchasing some constrained item.

A common approach to both deter bots and to resolve scaling issues is to put all possible customers in a waiting room and only let a percent of traffic go through and make purchases. One significant challenge with this approach is the fact this puts all customers in a waiting room regardless what products they want to buy (thus, penalizing or delaying customers who are not interested in the constrained products). As a result, many legitimate customers may give up on attempting to purchase the constrained items.

The present approaches provide a variety of technical implementations in the service 110 and user interface instances 121 for addressing such issues, including the use of one or more dynamic user interface controls that can be dynamically enabled or disabled for control of constrained item demand. Such dynamic user interface controls provide clear benefits to more accurately control access and prevent scaling issues or runaway demand. Further, in contrast to prior solutions which used waiting rooms or queues to introduce delays for all items, the following approaches can be applied only to items in high demand, without penalizing other products or commerce workflows. The present techniques also allow implementation of such delays and bot-circumvention measures without needing separate shopping carts or ordering processes.

Figure 2:
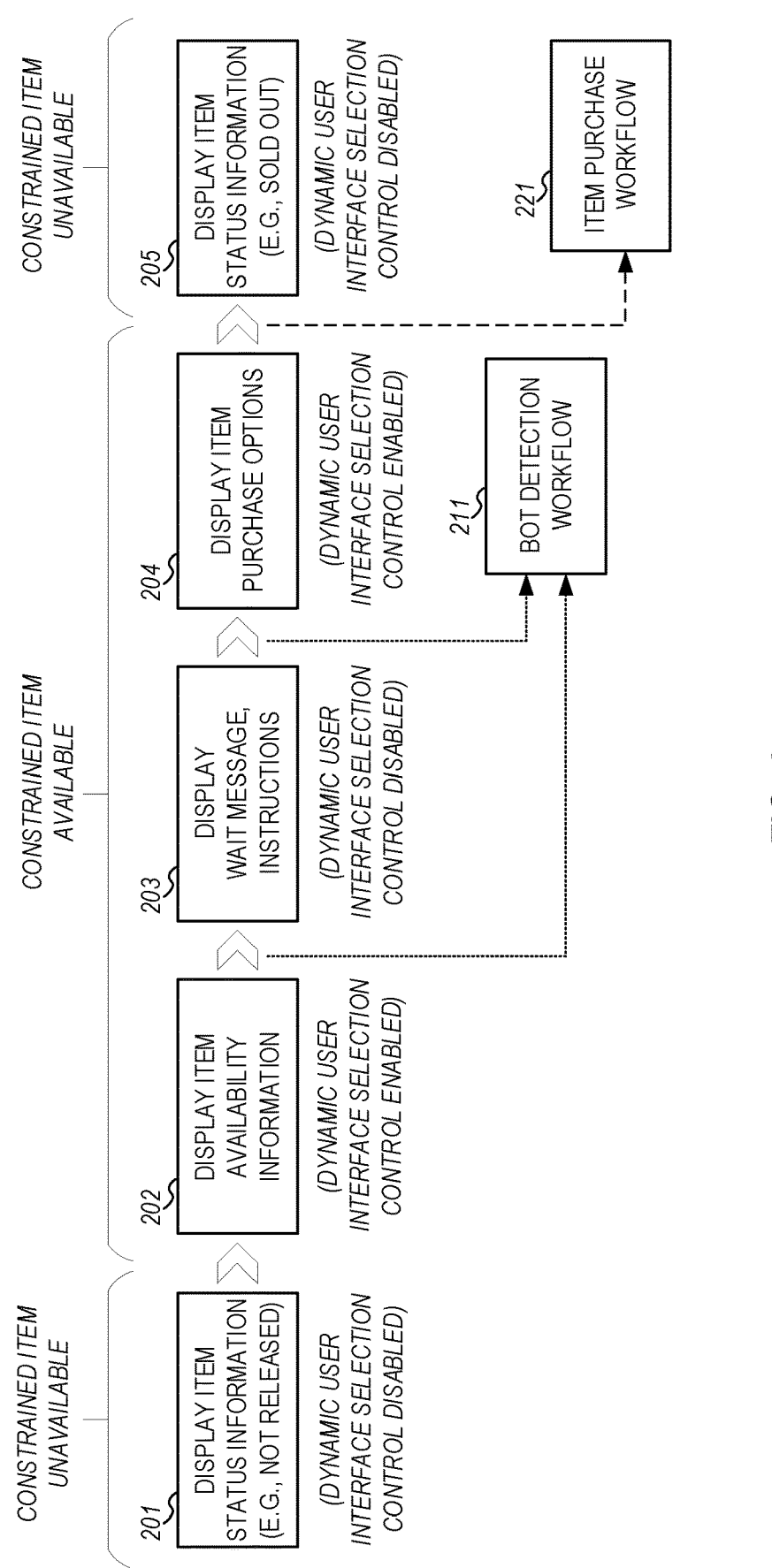
FIG. 2 illustrates an example sequence of functionality provided within a user interface for use with a constrained item according to an example.

FIG. 2 depicts an example sequence of functionality, provided within a user interface, for use with a constrained item. Here, this functionality sequence depicts a first period of time where a constrained item is unavailable for purchase (e.g., the product is unavailable (embargoed) from release or purchase, due to manufacturer restrictions or limitations), followed by a second period of time that the constrained item is available (e.g., the product is released for purchase). This is followed by a third period of time where the constrained item is again unavailable for purchase (e.g., the product is sold out, a period for sales is over, or other restrictions on the item is imposed). The logic used to implement the dynamic user interface control may respond to each of these scenarios.

The sequence of user interface functionality begins at operation 201, when a constrained item is unavailable, and the dynamic user interface control is disabled. Here, a display of item status information can be provided in the dynamic user interface control. For example, the item status information may indicate that a product is not released, a product sale has not started, the product has been backordered or sold out, or other reasons that the item is not available for purchase.

The sequence of user interface functionality continues at operation 202, when the constrained item becomes available and the dynamic user interface control is enabled. For instance, this event may correspond to a product release date or suitable inventory or sale price being released for purchase. This condition continues until the dynamic user interface control is interacted with (e.g., clicked).

The sequence of user interface functionality continues at operation 203, after receiving user interaction with the dynamic user interface control. In response to the user interaction, the dynamic user interface control becomes disabled and is transitioned to a "wait" message or instructions. This operation continues until a waiting period has elapsed, and the dynamic user interface control is re-enabled. In some examples, the waiting period may be uniquely calculated or determined for the individual user, and may be extended (or shortened) based on the characteristics of the user, events occurring within the user interface or service, or based on the detection of possible abusive activity which resemble bot behavior.

The sequence of user interface functionality continues at operation 204, after the waiting period has elapsed. The dynamic user interface control again is enabled, and may provide item selection or purchase options for use in an item purchase workflow 221. For instance, the activation of the dynamic user interface control may start the item purchase workflow 221 for adding to cart, proceeding to checkout, securing a reservation, etc.

The sequence of user interface functionality completes at operation 205, based on when the constrained item is again unavailable (e.g., is sold out). This may occur automatically, such as when inventory sells out. The dynamic user interface control or another user interface element may display a status message indicating this event and further instructions or information for a user.

Another workflow shown in FIG. 2 includes the use of a bot detection workflow 211 which is activated if unusual activity occurs with the dynamic user interface control. Such unusual activity may include repeated clicking on a button when it is disabled, attempting multiple activations of an enabled button, taking an action that is inconsistent with instructions presented on the button or screen, failure to pass or attempts to bypass a CAPTCHA, or the like. This bot workflow 211 may be triggered before or after dynamic user interface control is enabled. Additional details on a bot detection workflow are described with reference to FIG. 7, discussed below.

Various technologies may be used for disabling and enabling the dynamic user interface control, including to accomplish the views provided in FIGS. 3 to 6D. Various client-side dynamic aspects such as scripting (e.g., JavaScript) may be used to enable, disable, switch, or change features on a page or screen. Additionally, tracking features may be provided in order to determine the status of the particular interaction or transaction. Such tracking features may be used to invoke the bot detection workflow, and to ensure that items added to cart at an earlier time (e.g., when not restricted as a constrained item) cannot be purchased without interaction via the dynamic user interface control.

As one example, scripting may be used to track each click on an "add to cart" button of a constrained item and control of such button. For instance, an attribute with significant information may be created for the customer (e.g., customer id, time when the request was made, which sales channel was used to make the request (web, app), and how many times they clicked on the add to cart button) and communicated in a client request to a server. Using this information along with other bot prevention rules, a delay timer is provided in a response back from the server to the client. Then, a response from the server provides a special attribute that is encrypted when sent to the client. The client-side logic (e.g., implemented in JavaScript) uses the special key to decrypt the attribute, and takes the delay timer that has been embedded inside the attribute. The logic uses the timer to decide whether to disable the button, and how long to disable the button. The client side scripting will then run a timer to control when to enable the button based on the timer.

Figure 3:
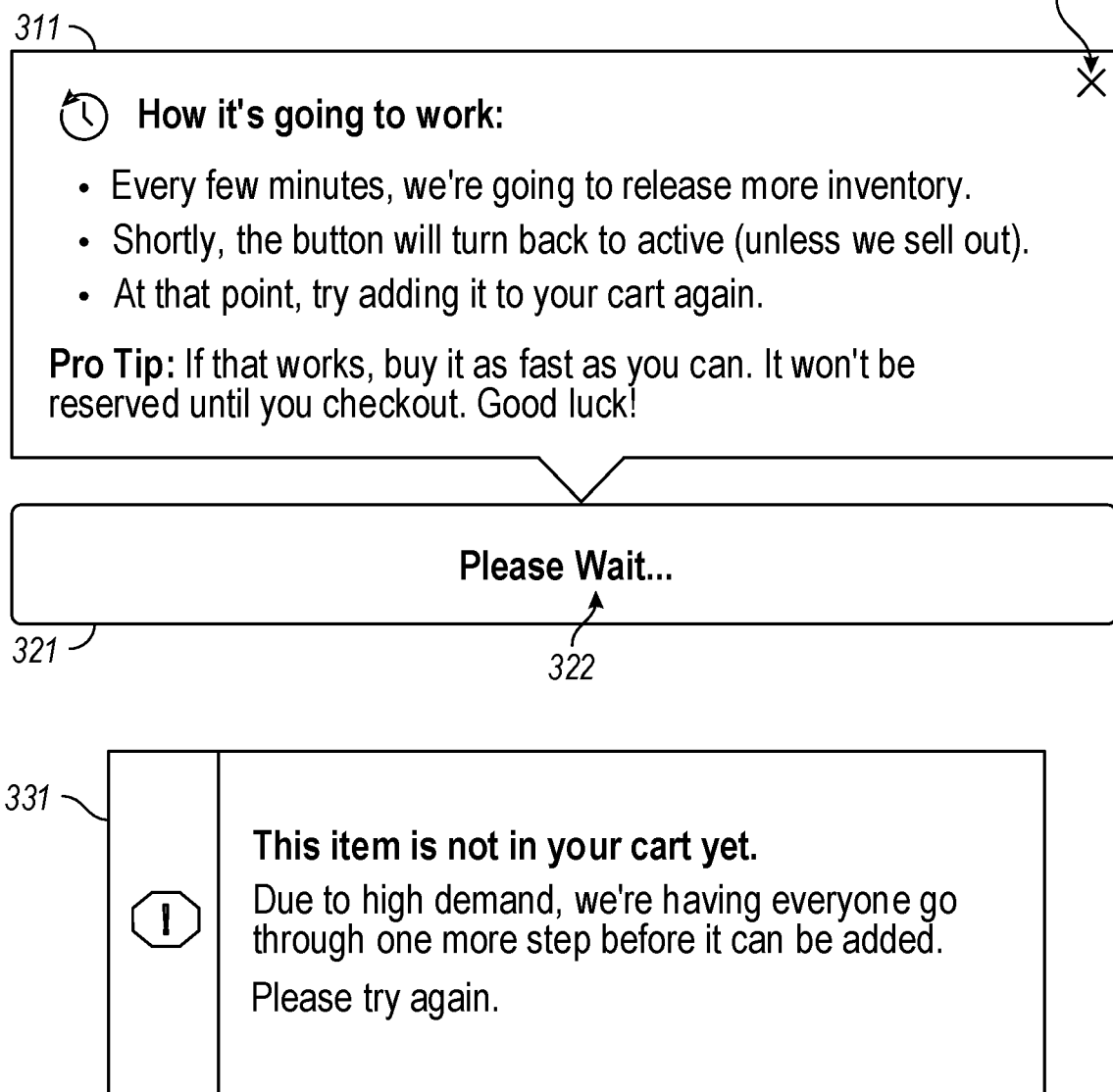
FIG. 3 illustrates an example implementation of a dynamic user interface control for use within a graphical user interface according to an example.

FIG. 3 depicts an example implementation of the dynamic user interface control as a button 321, which is accompanied by descriptive button text 322 and a descriptive overlay message 311. The button 321, the descriptive overlay message 311, or other user interface features may also include a status message 331 which is provided on another location of the user interface (e.g., below, above, or as a pop-up) which explains the current status of an intended shopping action.

For instance, the descriptive overlay message 311 or the status message 331 may provide instructions for the user to follow, or general information on the status of the button. The descriptive overlay message 311 may itself include other user interface controls, such as a user interface control 312 to close or minimize the descriptive message. In some examples, the descriptive overlay message 311 may also include a countdown clock or schedule, or information related to the delay; however, in other examples, the amount of time related to the delay is intentionally unpredictable.

Figure 4:
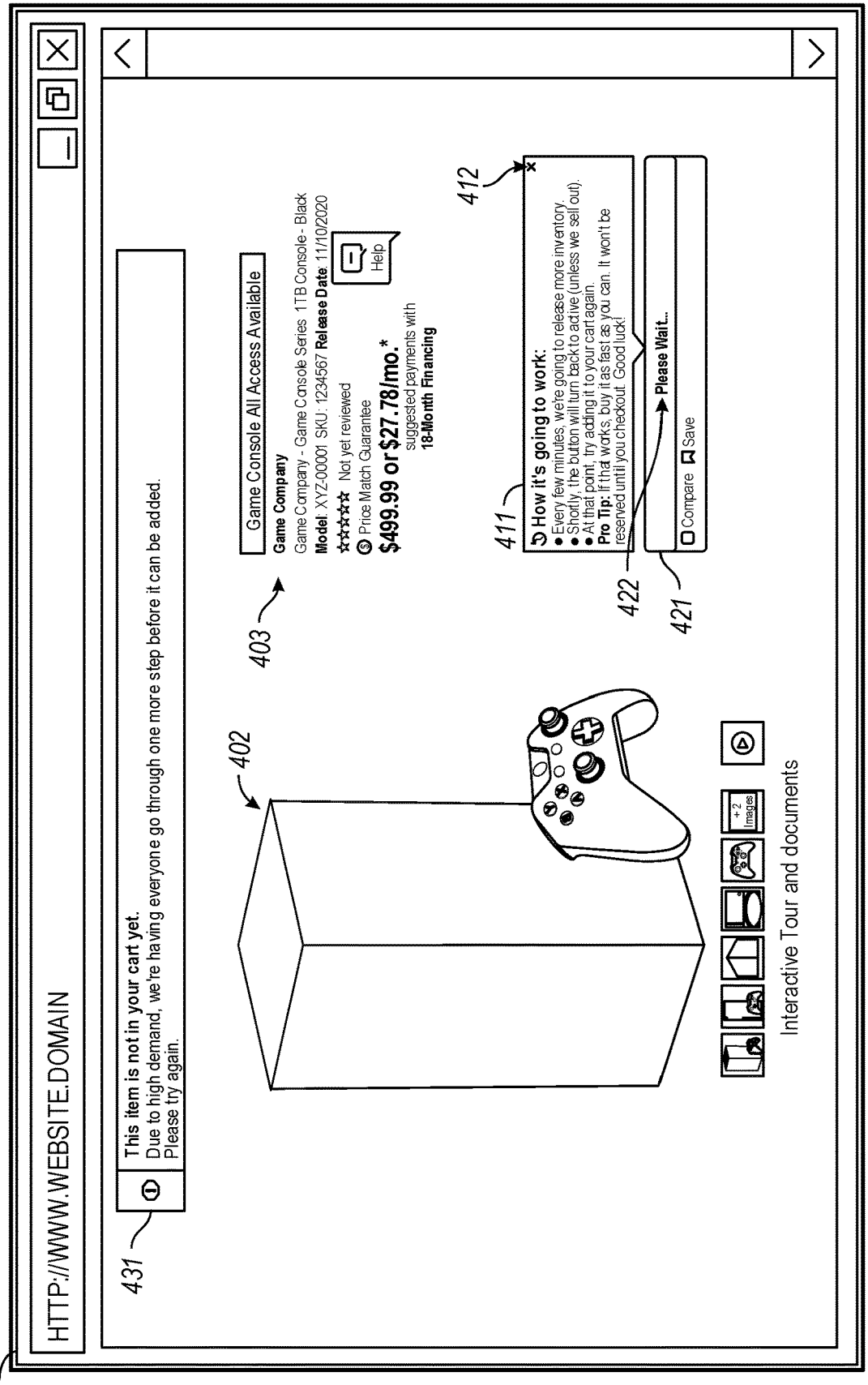
FIG. 4 illustrates an example implementation of the dynamic user interface control, located within a website user interface, according to an example.

FIG. 4 depicts an example implementation of the dynamic user interface control within a web browser 401 which accesses a website user interface. Here, the descriptive message 411 (which can be closed or toggled with user interface control 412) is placed on the website as a pop-up overlay, in a location above a dynamic user interface control 421. The dynamic user interface control 421 includes a message 422 to "Please Wait", which appears on the button after a user clicks on the button with an initial status of "Check Availability" or "Check Status". Additionally, the status message 431 is placed in proximity to product information 403 and product illustrations 402, and includes additional instructions on how to proceed with the intended purchase transaction.

Figure 5A:
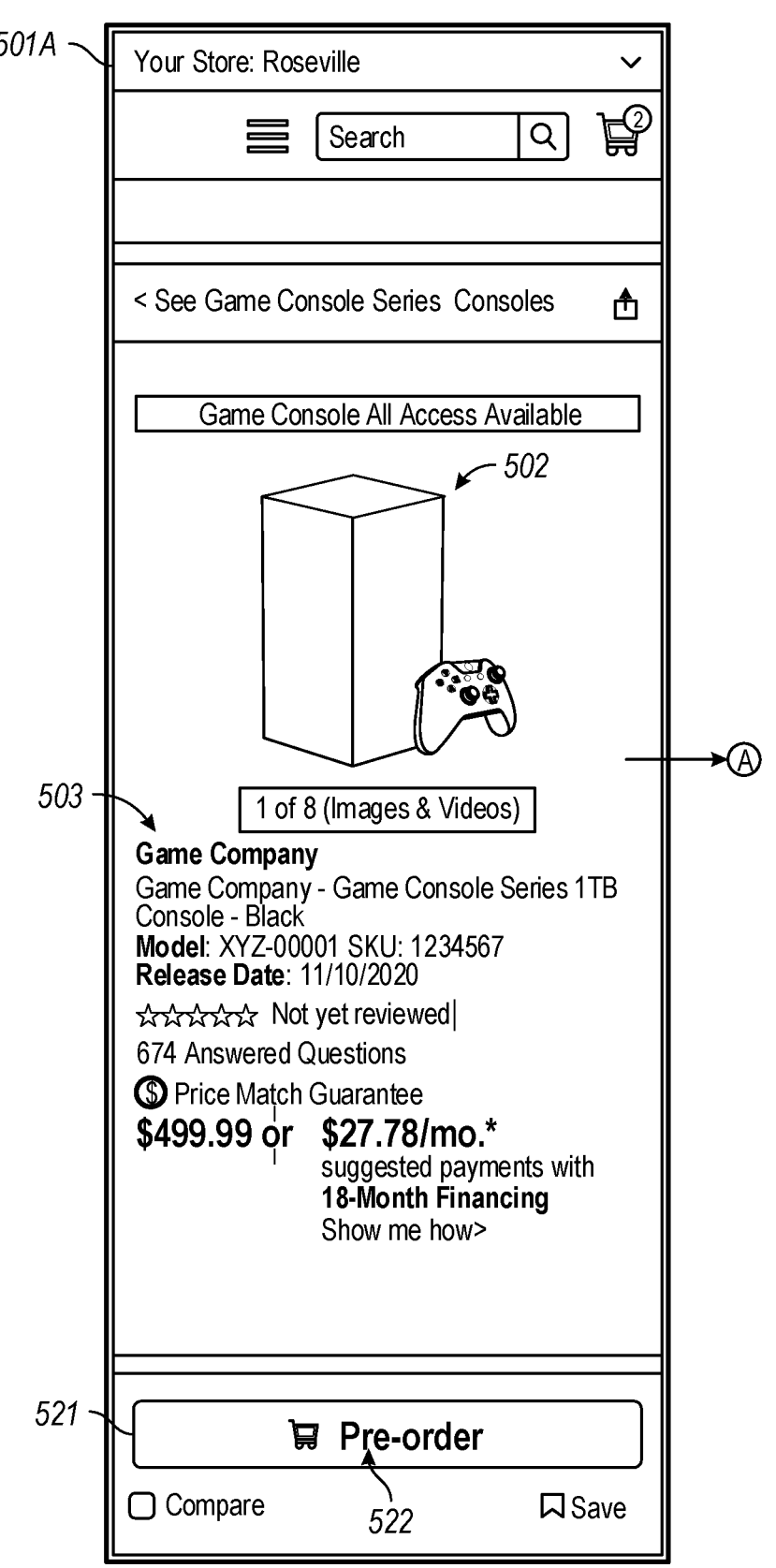

FIGS. 5A to 5C depict an example implementation of the dynamic user interface control within a software app 501 (with software app views 501A, 501B, 502C). Here, the drawings progressively depict a sequence (beginning with 501A, transitioning to 501B, transitioning to 501C) in which a dynamic user interface control 521 and accompanying functionality is changed.

First, FIG. 5A depicts the software app view 501A having product information 503 and product illustrations 502 in a first section of the app, and a dynamic user interface control 521 in the second section of the app. The dynamic user interface control 521 includes descriptive button text 522 which indicates a selectable option to "Pre-order" the indicated product.

Second, FIG. 5B depicts the software app view 501B after the dynamic user interface control 521 is activated by a user (clicked, tapped, pressed, etc.), causing the dynamic user interface control 521 to become disabled. Here, the descriptive button text 522 is changed to a "Please Wait . . . " status, and a descriptive message 511 is presented as an overlay of the product information 503. The descriptive message 511 includes a user interface control 512 to close or minimize the descriptive message as discussed above. Additionally, the software app view 501B presents a status message 531 in a location above the product information 503, which provides information and instructions for the user regarding the disabled state of the button and the intended delay.

Third, FIG. 5C depicts the software app view 501C after the dynamic user interface control 521 is re-enabled, such as after the delay period of time has elapsed or expired. As shown, the descriptive button text 522 is changed back to a "Pre-Order" status, and the dynamic user interface control 521 is enabled to allow user interaction. Other messages or indications that are not illustrated in FIG. 5C may also be provided in order to alert the user that the item is available for use in the purchase workflow.

FIGS. 6A to 6B depict other example implementations of the dynamic user interface control within a software app 601 (with software app views 601A, 601B). Here, the software app views 601A, 601B in FIGS. 6A and 6B depict the use of multiple dynamic user interface controls 611, 613 in enabled/disabled states on a search results listing 603. The software app view 601A (showing an enabled state of the controls 611, 613) transitions to view 601B (showing a disabled state of the controls 611, 613) when one or both of the dynamic user interface controls 611, 613 is selected by a user. The descriptive button text 612, 614 provided on the controls 611, 613 also changes to descriptive button text 615, 616, when one or both of the dynamic user interface controls 611, 613 is selected.

Likewise, FIG. 6A depicts the results of a scenario for the buttons 611, 613 and text 612, 613 that are applicable to an unconstrained item, which is available for adding to cart and purchase (i.e., the constrained item functionality is disabled), whereas FIG. 6B depicts the results of a scenario where the buttons 611, 613 and text 615, 616 are applicable to a constrained item (and the constrained item functionality is enabled). In other variations (not shown) different functionality may be toggled depending on whether cart, check-out, or other functionality is enabled for access by a user or a specific product or product type.

Figure 7:
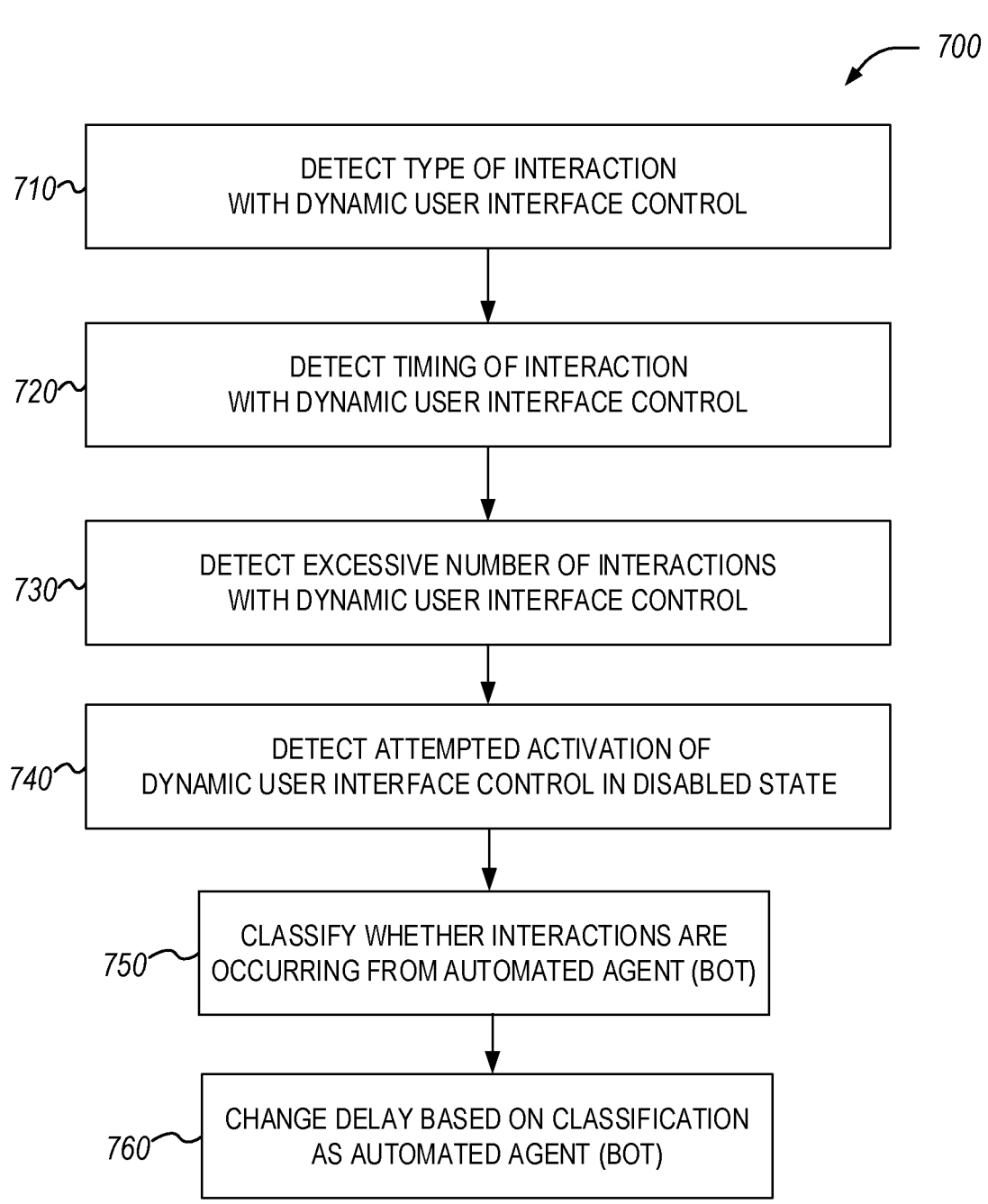
FIG. 7 illustrates a flowchart of an example method for analyzing and classifying bot operations, according to an example.

As referenced above, a number of functional aspects or features may be provided in order to detect improper interaction with the dynamic user interface control, such as improper interaction detected from bots and automated agents. FIG. 7 illustrates a flowchart 700 of an example process for analyzing and classifying bot operations, based on a sequence of detection operations. It will be understood that these operations may not necessarily follow the sequence depicted in flowchart 700, as some detection operations may be performed on an ongoing basis, or selectively performed in response to certain events occurring in a user interface.

The flowchart 700 depicts a first operation 710, to detect the type of interaction that is received from a user with the dynamic user interface control. For instance, the expected type of interaction may include a user clicking or pressing a button at particular position on a screen (e.g., on the center of the button). If an unexpected type of interaction is received, a potential bot interaction may be identified.

The flowchart 700 continues by depicting a second operation 720, to detect timing of interaction that is received from a user with the dynamic user interface control. For instance, the expected type of interaction may include a user clicking or pressing a button at a particular time (e.g., after X number of milliseconds after page or screen load, or after X number of milliseconds after button text is changed or a button state is changed from disabled to enabled). If an unexpected timing of interaction is received, a potential bot interaction may be identified.

The flowchart 700 continues to depict a third operation 730, to detect an excessive number of interactions that are received from a user with the dynamic user interface control. For instance, if the button experiences clicking, depression, or activation more than 1, 2, or a defined number of times, then a potential bot interaction may be identified.

The flowchart 700 continues to depict a fourth operation 740, to detect interactions that are received from a user when the dynamic user interface control is in a disabled or other inactivated or inoperable state. For instance, if the button experiences clicking, depression, or activation even though the button is labeled with "Please Wait" or another human-understandable instruction, then a potential bot interaction may be identified.

The flowchart 700 continues to depict a fifth operation 750, to collect data from the detected behaviors (e.g., any weightings, scores, or values derived from such behaviors) to classify whether interactions are occurring from a human or from an automated agent. For instance, the classification may permit some human behaviors to occur (e.g., double clicks on a button, or multiple clicks after the button is enabled) while prohibiting unexpected behaviors (e.g., clicking on the button at a regularly timed interval, or selecting the button in an abnormal location or fashion).

Finally, the flowchart 700 concludes at operation 760, to change the delay that is used within the website based on a classification of an automated agent. Such a delay may be extensively large (e.g., hours or days) but include changing status messages or button behaviors in an attempt to trick the automated agent or bot into expecting that the delay will end. FIG. 7.) In other examples, the user session or an identifier associated with the user may be added to a prohibited list, to prevent the user from any ordering of constrained items (or a subset of constrained items) on a temporary or permanent basis.

FIG. 8 illustrates a flowchart 800 of an example technique for adaptation of a user interface control in a software graphical user interface, for use with the constrained item scenarios discussed above. It will be understood that the operations of the flowchart 800 may be implemented in connection with a computer-implemented method, instructions on a computer readable medium, or on a configuration of a computing device or system (or among multiple of such methods, products, or computing devices/systems). In an example, the electronic operations are performed by a computing device that operates to host and generate features of a user-accessible user interface (e.g., from a web server, or for use with a network-connected software app); in another example, the electronic operations are performed within aspects of distributed or client computing devices used to present the user interface.

As shown, the flowchart 800 begins with operation 810 to identify a constrained item condition. This may occur in response to specific product or item release schedules or timelines, designation of a certain brand, model, type, or class of product, or from dynamically observed conditions (e.g., by dynamically detecting that some product has limited quantities, or that a high number of orders are being placed for a product in a short period of time). In an example, rules or criteria may be established to automatically identify and apply a constrained item condition in an e-commerce workflow setting.

The flowchart 800 continues at operation 820 to provide and enable a user interface control in the graphical user interface. The user interface control is provided in an enabled state to receive interaction from a user, and the enabled state of the user interface control provides functionality for the user to attempt an initial commerce action with a particular constrained item or set of constrained items. In an example, the user interface control is a button, although other types of user interface controls may be used as discussed above. The initial commerce action may involve checking availability of the product, or may involve an initial attempt to add to a shopping cart or initiate a purchase of the item.

The flowchart 800 continues at operation 830 to changing the user interface control from the enabled state to a disabled state, in response to (e.g., after) receipt of the interaction from the user. In an example, the interaction to be received from the user includes selection (e.g., clicking, depression, activation) of the button from the user within the graphical user interface.

The flowchart 800 continues at operation 840 to calculate a wait time to enact a delay (e.g., a delay time period), and continues at operation 850 to enforce a wait time for the delay (e.g., to implement the delay time period). In an example, the delay time period is uniquely calculated to the user. This delay time period may be calculated based on random assignment or selection to the user session. In another example, the delay time for the disabled state is calculated based on one or more characteristics of the user (e.g., a user profile) or actions taken by the user in the graphical user interface (e.g., depending on whether the user is performing actions that are or are not likely to originate from an automated bot).

The flowchart 800 continues at operation 860 with an optional operation to calculate an updated wait time to enforce the delay (e.g., to extend the delay time period in which the user interface control is disabled). The calculation of the updated delay time period may be triggered in response to the detection of at least one interaction with the user interface control, such as unexpected clicking or interactions which occur during the delay time period. Other unexpected actions or results, including those depicted in the workflow of flowchart 700 to detect a bot, may also be evaluated. In an example, if multiple interactions with the user interface control are detected during the delay time period, then the updated delay time period is sufficiently extended to prevent the user interface control from changing from the disabled state to the enabled state during the current user session.

The flowchart 800 continues at operation 870 to transition (e.g., change) the user interface control from the disabled state to the enabled state, in response to expiration (e.g., elapsing) of the delay time period. The enabled state of the user interface control provides functionality for the user to perform a commerce action with the constrained item.

The flowchart 800 concludes at operation 880 to allow a selection (and, purchase, reservation, or other commerce action) of the constrained item, after receipt of a second (or subsequent) interaction with the enabled dynamic user interface control. For instance, the selection of the constrained item may enable purchase of the constrained item in an electronic commerce workflow, with the selection of the constrained item being provided in response to receipt of the second interaction in the enabled state and after expiration of the delay time period.

In a further aspect, a first instance of the enabled state for the dynamic user interface control (e.g., caused from the enabled control at operation 820) includes a first descriptive text on the user interface control (e.g., button text such as "Check Availability") that indicates an initial availability to select the constrained item. Then, an instance of the disabled state (e.g., caused by the transition of operation 830) provides a second descriptive text on the user interface control (e.g., button text such as "Please Wait") that indicates a delay to select the constrained item. Finally, a second instance of the enabled state (e.g., caused by the transition of operation 870) provides a third descriptive text on the user interface control (e.g., button text such as "Add to Cart") to indicate availability to select (e.g., reserve or purchase) the constrained item. This may follow the sequence depicted with reference to FIGS. 5A to 5C discussed above.

Also in a further aspect, other messages or features, such as at least one status message, is changed in the graphical user interface in response to changing the user interface control from the enabled state to the disabled state. For instance, the at least one status message may provide information relating to the delay time period and the disabled state. In a still further aspect, the at least one status message is changed in the graphical user interface in response to changing the user interface control from the disabled state to the enabled state, to alert a user that the item can be selected and reserved/ordered. Other forms of messages and information displays may also be triggered and modified based on the user interface control.

Figure 9:
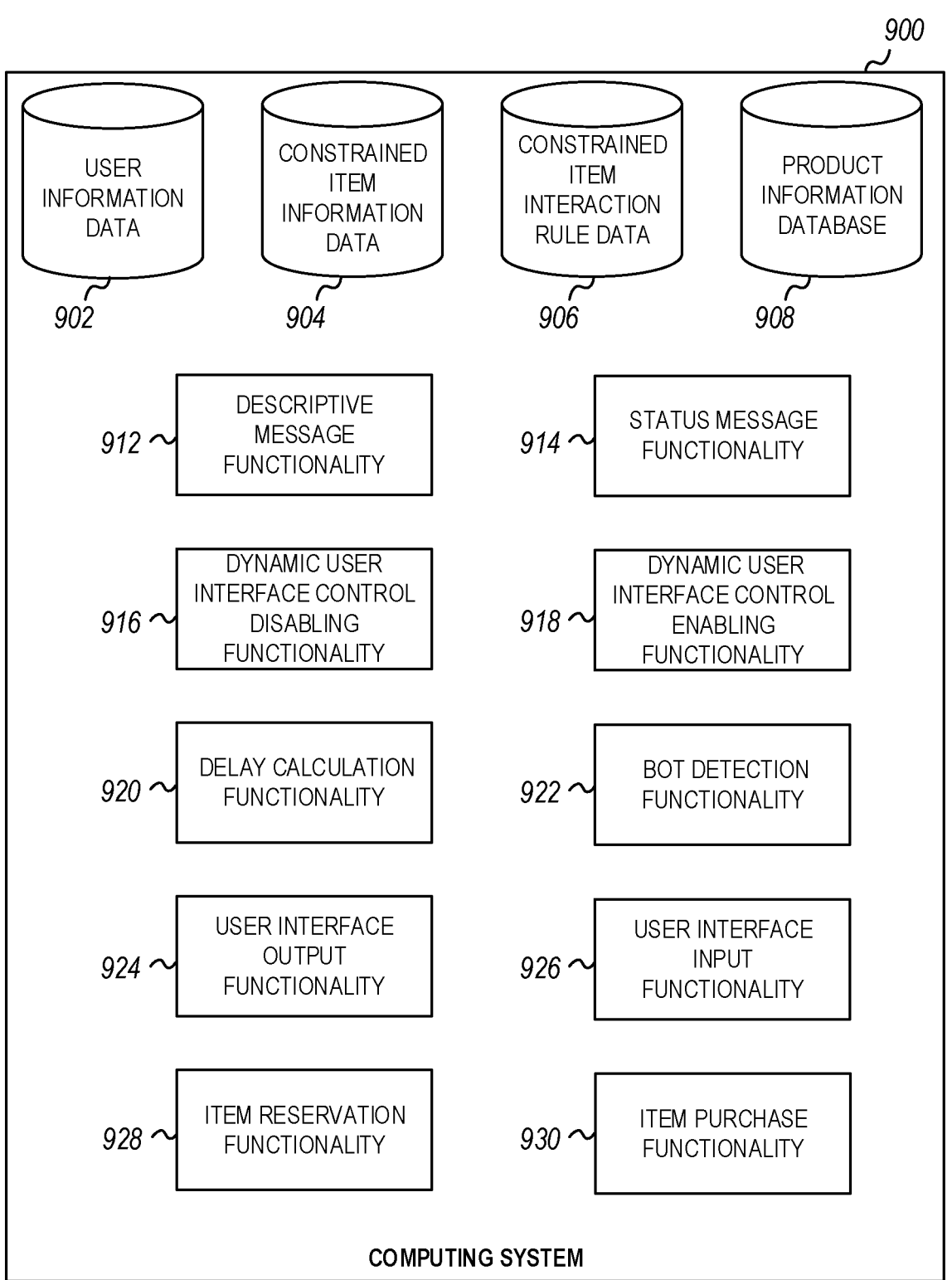
FIG. 9 illustrates a block diagram of computing system components implementing user interface functionality for constrained item scenarios, according to an example.

Other combinations and subsystems may be implemented to coordinate with the operations of flowchart 800, such as illustrated with the following components in FIG. 9.

Although many of the preceding and following operations are described with reference to the server-side user interface functions, it will be understood that corresponding operations may be programmatically established or controlled at a client within a browser or software app.

FIG. 9 illustrates a block diagram of hardware and functional components of a computing system 900 to implement user interface functionality for constrained item scenarios, for the interaction and ordering of constrained items, such as are accomplished with the examples described above. It will be understood, that although certain hardware and functional components are depicted in FIG. 9 and in other drawings as separate subsystems or services, the features of the subsystems or services may be integrated into a single system or service (e.g., in an application programming interface hosted by a server computing system). Further, although only one computing system is depicted, it will be understood that the features of these systems may be distributed among one or multiple computing systems (including in cloud-based processing settings).

As shown, the computing system 900 includes various functionality subsystems 912-930 used to implement functionality of the dynamic user interface control for selection of a constrained item (e.g., to implement the techniques discussed above for FIGS. 1-8) and data stores 902-908 (e.g., databases) to store and provide information that facilitate selection, purchase, and fulfillment of the constrained item. In an example, the computing system 900 is adapted to execute software applications that implement the functionality subsystems and databases, through software application processing components and functionality, such as circuitry and software instructions.

In an example, the computing system 900 is adapted to implement respective functionality including: descriptive message processing or functionality 912 (e.g., circuitry or software instructions) used to generate, display, update, or provide descriptive messaging regarding constrained items and user instructions for the selection of constrained items; status message processing or functionality 914 (e.g., circuitry or software instructions) used to generate, display, update, or provide status messaging regarding constrained items and delays for the selection of constrained items; dynamic user interface control disabling processing or functionality 916 (e.g., circuitry or software instructions) used to disable or otherwise de-activate features of a user interface control for the selection of constrained items; dynamic user interface control enabling processing or functionality 918 (e.g., circuitry or software instructions) used to enable or otherwise activate features of a user interface control for the selection of constrained items; delay calculation processing or functionality 920 (e.g., circuitry or software instructions) used to determine or modify a delay time period for disabling a user interface control to perform the selection of constrained items; bot detection processing or functionality 922 (e.g., circuitry or software instructions) used to identify automated bots or agents which attempt interaction with the user interface control for the selection of constrained items; user interface output processing or functionality 924 (e.g., circuitry or software instructions) used to provide output features and arrangements of a user interface which includes the user interface control; user interface input processing or functionality 926 (e.g., circuitry or software instructions) used to identify and respond to input from the user interface which includes the user interface control; item reservation processing or functionality 928 (e.g., circuitry or software instructions) used to reserve or manage a shopping cart for a constrained item selected with the user interface control;

and item purchase processing or functionality 930 (e.g., circuitry or software instructions) used to purchase or conduct other transaction for a constrained item selected with the user interface control. Other functional and processing aspects may be performed or structurally embodied by the computing system 900 (or coordinated computing systems or devices) to implement the techniques discussed above for FIGS. 1-8.

Embodiments used to facilitate and perform the techniques described herein may be implemented in one or a combination of hardware, firmware, or software. Embodiments may also be implemented as instructions stored on a machine-readable storage medium (e.g., a storage device), which may be read and executed by at least one processor to perform the operations described herein. A machine-readable storage medium may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Figure 10:
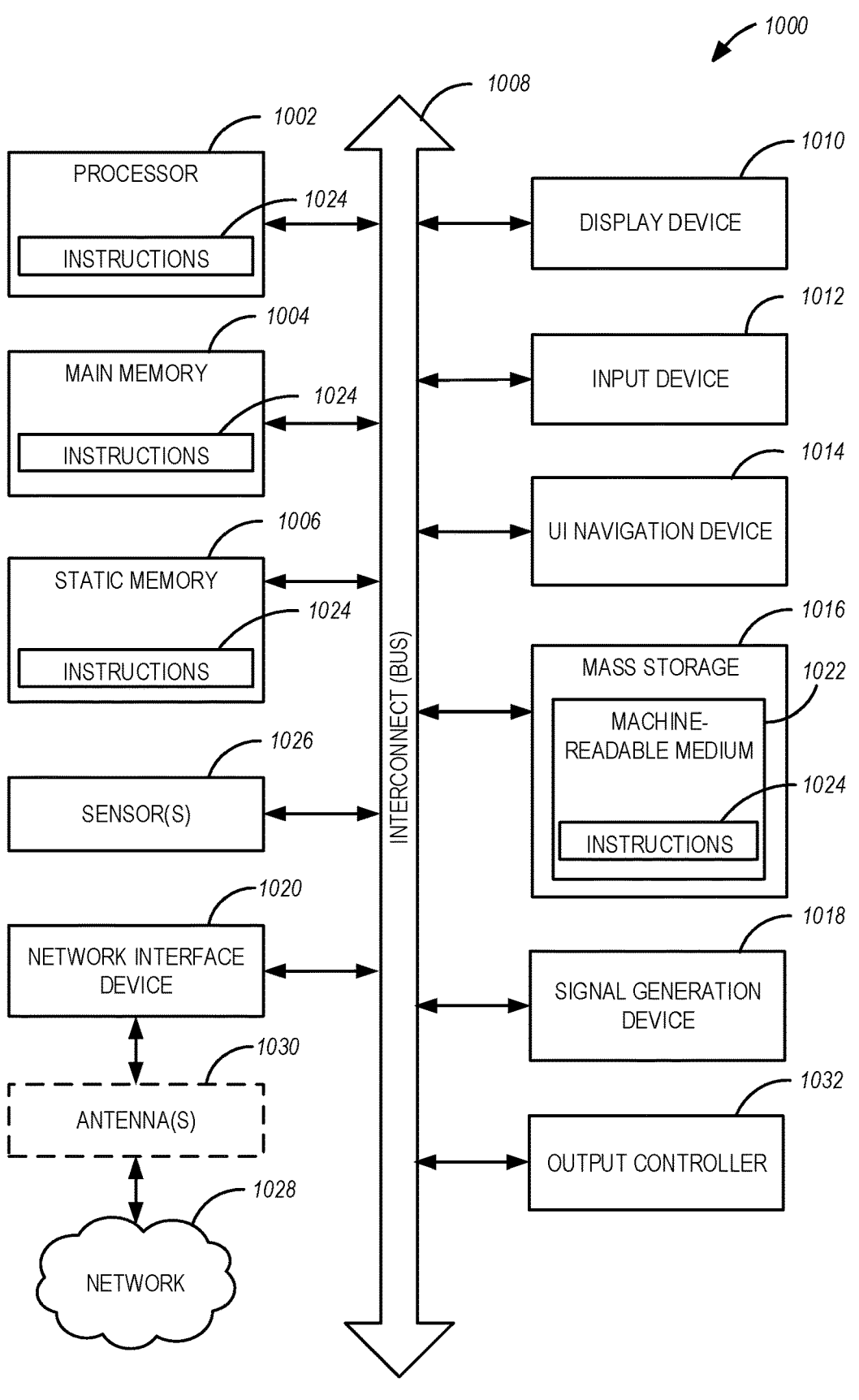
FIG. 10 illustrates a block diagram of operational components of a computing system upon which any one or more of the techniques herein discussed may be executed and implemented.

FIG. 10 illustrates a block diagram illustrating a machine in the example form of a computer system 1000, within which a set or sequence of instructions may be executed to cause the machine to perform any one of the methodologies discussed herein, according to an example. Computer system machine 1000 may be embodied by the computing system 900; the subsystem(s) implementing the data stores 902-908; the subsystem(s) implementing the various modules or functionality 912-930; the services and engines 110, 116, 118 and data stores 112, 114; the computing devices 124, 125, 126; or any other electronic processing or computing platform described or referred to herein. Further, the computer system machine 1000 may embody instructions and data to perform any of the interfaces or functions referenced for FIGS. 1-9.

Example computer system 1000 includes at least one processor 1002 (e.g., a central processing unit (CPU), a graphics processing unit (GPU) or both, processor cores, compute nodes, etc.), a main memory 1004 and a static memory 1006, which communicate with each other via an interconnect 1008 (e.g., a link, a bus, etc.). The computer system 1000 may further include a video display unit 1010, an alphanumeric input device 1012 (e.g., a keyboard), and a user interface (UI) navigation device 1014 (e.g., a mouse). In one example, the video display unit 1010, input device 1012 and UI navigation device 1014 are incorporated into a touchscreen interface and touchscreen display. The computer system 1000 may additionally include a storage device 1016 (e.g., a drive unit), a signal generation device 1018 (e.g., a speaker), an output controller 1032, a network interface device 1020 (which may include or operably communicate with one or more antennas 1030, transceivers, or other wireless communications hardware), and one or more sensors 1026, such as a global positioning system (GPS) sensor, compass, accelerometer, location sensor, or other sensor.

The storage device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004, static memory 1006, and/or within the processor 1002 during execution thereof by the computer system 1000, with the main memory 1004, static memory 1006, and the processor 1002 also constituting machine-readable media.

While the machine-readable medium 1022 is illustrated in an example to be a single medium, the term "machine-readable medium" may include a single medium or multiple media (e.g., a centralized or distributed database, and/or associated caches and servers) that store the one or more instructions 1024. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 1024 may further be transmitted or received over a communications network 1028 using a transmission medium via the network interface device 1020 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 2G/3G, 4G LTE/LTE-A, 5G, or Satellite communication networks). The term "transmission medium" shall be taken to include any intangible medium that is capable of storing, encoding, or carrying instructions for execution by the machine, and includes digital or analog communications signals or other intangible medium to facilitate communication of such software.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Additional examples of the presently described method, system, and device embodiments include the following configurations recited by the claims. Each of the examples in the claims may stand on its own, or may be combined in any permutation or combination with any one or more of the other examples provided below or throughout the present disclosure.

What is claimed is:

1. A method for presentation of a user interface control in a software graphical user interface, implemented with electronic operations executed using a processor and memory of a computing system, the method comprising:

providing a user interface button in a screen of the software graphical user interface, the user interface button provided in an enabled state to receive a first interaction from a human or automated user;

receiving the first interaction from the user via the user interface button, wherein the first interaction from the user provides a first request to initiate a commerce action with a constrained item;

calculating a delay time period to disable functionality of the user interface button and delay the commerce action with the constrained item, wherein the delay time period is uniquely calculated for the user and is not displayed to the user;

in response to receiving the first interaction from the user, starting the delay time period and providing a presentation of a descriptive overlay message on the screen, wherein the presentation of the descriptive overlay message is provided during the delay time period;

enforcing the delay time period to disable the functionality of the user interface button, which prevents the graphical user interface from performing the commerce action with the constrained item during the delay time period;

receiving a second interaction from the user via the user interface button, outside of the presentation of the descriptive overlay message on the screen, wherein the second interaction from the user provides a second request to initiate the commerce action with the constrained item during the delay time period;

in response to receiving the second interaction from the user, calculating an updated delay time period that extends the delay time period to disable the functionality of the user interface button and further delay the commerce action with the constrained item, wherein the updated delay time period is not displayed to the user; and enforcing the updated delay time period to disable the functionality of the user interface button, which prevents the graphical user interface from performing the commerce action with the constrained item until expiration of the updated delay time period, wherein the presentation of the descriptive overlay message continues during the updated delay time period.

2. The method of claim 1, wherein the commerce action is:

adding the constrained item to an electronic shopping cart, initiating or completing a purchase of the constrained item in an electronic shopping cart, or requesting a reservation of the constrained item.

3. The method of claim 1, wherein the presentation of the descriptive overlay message on the screen includes a message that indicates an occurrence of the delay of the commerce action with the constrained item without indicating an amount of time remaining in the delay time period.

4. The method of claim 1, wherein the first interaction from the user comprises a first selection of the user interface button received within a first instance of the graphical user interface, and wherein the second interaction from the user comprises a second selection of the user interface button received within a second instance of the graphical user interface.

5. The method of claim 1, wherein the descriptive overlay message is provided as a popup on an individual product display screen corresponding to the constrained item, wherein the presentation of the descriptive overlay message is closed by the user during the delay time period, and wherein the second interaction from the user comprises another activation of the user interface button.

6. The method of claim 1, wherein the second interaction from the user comprises one or more additional clicks or interactions with the graphical user interface that occur during the delay time period, and wherein the second interaction from the user is determined as likely to originate from an automated bot.

7. The method of claim 1, wherein the delay time period is uniquely calculated for the user based on a user profile or customer identifier.

8. A non-transitory computer-readable storage medium, the computer-readable storage medium comprising instructions that, when executed by processor circuitry and memory of a computing device, causes the computing device to perform operations that:

output a user interface button in a screen of a software graphical user interface, the user interface button provided in an enabled state to receive a first interaction from a human or automated user;

detect the first interaction from the user via the user interface button, wherein the first interaction from the user provides a first request to initiate a commerce action with a constrained item;

calculate a delay time period to disable functionality of the user interface button and delay the commerce action with the constrained item, wherein the delay time period is uniquely calculated for the user and is not displayed to the user;

in response to receipt of the first interaction from the user, start the delay time period and output a presentation of a descriptive overlay message on the screen, wherein the presentation of the descriptive overlay message is provided during the delay time period;

enforce the delay time period to disable the functionality of the user interface button, which prevents the graphical user interface from performing the commerce action with the constrained item during the delay time period;

detect a second interaction from the user via the user interface button, outside of the presentation of the descriptive overlay message on the screen, wherein the second interaction from the user provides a second request to initiate the commerce action with the constrained item during the delay time period;

in response to receipt of the second interaction from the user, calculate an updated delay time period that extends the delay time period to disable the functionality of the user interface button and further delay the commerce action with the constrained item, wherein the updated delay time period is not displayed to the user; and enforce the updated delay time period to disable the functionality of the user interface button, which prevents the graphical user interface from performing the commerce action with the constrained item until expiration of the updated delay time period, wherein the presentation of the descriptive overlay message continues during the updated delay time period.

9. The non-transitory computer-readable storage medium of claim 8, wherein the commerce action is:

adding the constrained item to an electronic shopping cart, initiating or completing a purchase of the constrained item in an electronic shopping cart, or requesting a reservation of the constrained item.

10. The non-transitory computer-readable storage medium of claim 8, wherein the presentation of the descriptive overlay message on the screen includes a message that indicates an occurrence of the delay of the commerce action with the constrained item without indicating an amount of time remaining in the delay time period.

11. The non-transitory computer-readable storage medium of claim 8, wherein the first interaction from the user comprises a first selection of the user interface button received within a first instance of the graphical user interface, and wherein the second interaction from the user comprises a second selection of the user interface button received within a second instance of the graphical user interface.

12. The non-transitory computer-readable storage medium of claim 8, wherein the descriptive overlay message is provided as a popup on an individual product display screen corresponding to the constrained item, wherein the presentation of the descriptive overlay message is closed by the user during the delay time period, and wherein the second interaction from the user comprises another activation of the user interface button.

13. The non-transitory computer-readable storage medium of claim 8, wherein the second interaction from the user comprises one or more additional clicks or interactions with the graphical user interface that occur during the delay time period, and wherein the second interaction from the user is determined as likely to originate from an automated bot.

14. The non-transitory computer-readable storage medium of claim 8, wherein the delay time period is uniquely calculated for the user based on a user profile or customer identifier.

15. A computer system comprising:

at least one processor; and memory coupled to the at least one processor and storing instructions that, when executed by the at least one processor, cause the computer system to perform operations that:

provide a user interface button in a screen of a software graphical user interface, the user interface button provided in an enabled state to receive a first interaction from a human or automated user;

receive the first interaction from the user via the user interface button, wherein the first interaction from the user provides a first request to initiate a commerce action with a constrained item;

calculate a delay time period to disable functionality of the user interface button and delay the commerce action with the constrained item, wherein the delay time period is uniquely calculated for the user and is not displayed to the user;

in response to receipt of the first interaction from the user, start the delay time period and provide a presentation of a descriptive overlay message on the screen, wherein the presentation of the descriptive overlay message is provided during the delay time period;

enforce the delay time period to disable the functionality of the user interface button, which prevents the graphical user interface from performing the commerce action with the constrained item during the delay time period;

receive a second interaction from the user via the user interface button, outside of the presentation of the descriptive overlay message on the screen, wherein the second interaction from the user provides a second request to initiate the commerce action with the constrained item during the delay time period;

in response to receipt of the second interaction from the user, calculate an updated delay time period that extends the delay time period to disable the functionality of the user interface button and further delay the commerce action with the constrained item, wherein the updated delay time period is not displayed to the user; and enforce the updated delay time period to disable the functionality of the user interface button, which prevents the graphical user interface from performing the commerce action with the constrained item until expiration of the updated delay time period, wherein the presentation of the descriptive overlay message continues during the updated delay time period.

16. The computer system of claim 15, wherein the commerce action is: adding the constrained item to an electronic shopping cart, initiating or completing a purchase of the constrained item in an electronic shopping cart, or requesting a reservation of the constrained item.

17. The computer system of claim 15, wherein the presentation of the descriptive overlay message on the screen includes a message that indicates an occurrence of the delay of the commerce action with the constrained item without indicating an amount of time remaining in the delay time period.

18. The computer system of claim 15, wherein the first interaction from the user comprises a first selection of the user interface button received within a first instance of the graphical user interface, and wherein the second interaction from the user comprises a second selection of the user interface button received within a second instance of the graphical user interface.

19. The computer system of claim 15, wherein the descriptive overlay message is provided as a popup on an individual product display screen corresponding to the constrained item, wherein the presentation of the descriptive overlay message is closed by the user during the delay time period, and wherein the second interaction from the user comprises another activation of the user interface button.

20. The computer system of claim 15, wherein the second interaction from the user comprises one or more additional clicks or interactions with the graphical user interface that occur during the delay time period, and wherein the second interaction from the user is determined as likely to originate from an automated bot.

21. The computer system of claim 15, wherein the delay time period is uniquely calculated for the user based on a user profile or customer identifier.

* * * * *